United States Patent
Kumar et al.

(10) Patent No.: US 12,508,269 B2
(45) Date of Patent: Dec. 30, 2025

(54) PARENTERAL DOSAGE FORM OF CARBOPLATIN

(71) Applicant: SUN PHARMACEUTICAL INDUSTRIES LIMITED, Mumbai (IN)

(72) Inventors: Samarth Kumar, Baroda (IN); Maheshkumar Parasmal Soni, Baroda (IN); Subhas Balaram Bhowmick, Baroda (IN); Prashant Kane, Baroda (IN)

(73) Assignee: SUN PHARMACEUTICAL INDUSTRIES LIMITED, Mumbai (IN)

( * ) Notice: Subject to any disclaimer, the term of this patent is extended or adjusted under 35 U.S.C. 154(b) by 1145 days.

(21) Appl. No.: 17/768,021

(22) PCT Filed: Aug. 30, 2019

(86) PCT No.: PCT/IB2019/057351
§ 371 (c)(1),
(2) Date: Apr. 11, 2022

(87) PCT Pub. No.: WO2020/044311
PCT Pub. Date: Mar. 5, 2020

(65) Prior Publication Data
US 2023/0140586 A1    May 4, 2023

(30) Foreign Application Priority Data
Aug. 31, 2018 (IN) .............................. 201821032809

(51) Int. Cl.
*A61K 31/555* (2006.01)
*A61K 9/08* (2006.01)
*A61K 47/02* (2006.01)

(52) U.S. Cl.
CPC .............. *A61K 31/555* (2013.01); *A61K 9/08* (2013.01); *A61K 47/02* (2013.01)

(58) Field of Classification Search
CPC ........ A61K 31/555; A61K 9/08; A61K 47/02; A61K 9/0019; A61K 47/26; A61J 1/10; A61J 3/002
See application file for complete search history.

(56) References Cited

U.S. PATENT DOCUMENTS

| | | | |
|---|---|---|---|
| 6,589,988 B1 * | 7/2003 | Kysilka | A61P 35/00 514/492 |
| 2006/0216360 A1 | 9/2006 | Upadhyay et al. | |
| 2015/0157614 A1 | 6/2015 | Sudhakar et al. | |

FOREIGN PATENT DOCUMENTS

| | | | | |
|---|---|---|---|---|
| CN | 105726475 A | 7/2016 | | |
| EP | 0334551 A1 | 9/1989 | | |
| EP | 1967188 A1 * | 9/2008 | ............... | A61J 1/00 |
| WO | WO-9520956 A1 * | 8/1995 | ........... | A61K 31/555 |
| WO | 2012065085 A1 | 5/2012 | | |

OTHER PUBLICATIONS

Pramanick et al. (Excipient Selection in Parenteral Formulation Development, Pharma Times, 2013). (Year: 2013).*
Extended European Search Report issued in EP19856330 on Apr. 7, 2022.
Rochard, E., et al., Stability and Compatibility Study of Carboplatin With Three Portable Infusion Pump Reservoirs, International Journal of Pharmaceutics, 1994, 101:257-262.
Bristol-Myers Squibb Company Princeton, New Jersey 08543 USA, pp. 1-21, Rev. Jul. 2010, https://www.accessdata.fda.gov/drugsatfda_docs/label/2010/020452s005lbl.pdf The whole document.
International Search Report issued in PCT/IB2019/057351 on Dec. 13, 2019.

* cited by examiner

Primary Examiner — Robert A Wax
Assistant Examiner — John Seungjai Kwon
(74) Attorney, Agent, or Firm — Blank Rome LLP (57) ABSTRACT

A parenteral dosage form having an infusion container filled with an aqueous solution in volumes ranging from 40 ml to 500 ml comprising 1 mg/ml to 2 mg/ml of carboplatin, wherein the solution contains known impurity of 1,1-cyclobutanedicarboxylic acid in an amount of not more than 1.0% by weight of carboplatin and the solution remains physically stable when stored at room temperature.

19 Claims, 4 Drawing Sheets

PARENTERAL DOSAGE FORM OF CARBOPLATIN

This application is the U.S. national stage of International Patent Application No. PCT/IB2019/057351, filed Aug. 30, 2019, which claims priority to Indian Patent Application No. 201821032809, filed Aug. 31, 2018.

FIELD OF THE INVENTION

The present invention relates to a storage stable aqueous solution of carboplatin and a parenteral dosage form containing it.

BACKGROUND OF THE INVENTION

Carboplatin is a platinum co-ordination compound, having chemical name as diammine [1,1-cyclobutanedicarboxylato(2-)-0, 0']. It is available commercially in the form of a lyophilized powder and pre-concentrate aqueous solution (10 mg/ml) under the brand name Paraplatin® by Bristol-Myers Squibb.

It is known in the art from numerous references and also from the pack insert of Paraplatin® that the reconstituted solutions of carboplatin are merely stable for 8 hours. In fact, Cheung Y W et al. Am J Hosp Pharm. 1987 January; 44(1):124-30, Swell G J et al. J Clin Pharm Ther. 1987 December; 12(6):427-32; R. Gust and B. Schnurr: Monatshefte fuË r Chemie 1999; 130: 637-44; all of these references have reported that the reconstituted carboplatin solutions are highly unstable. Myres et al; in the publication in Journal of Oncology Pharmacy Practice, 2016 February; 22 (1):31-6 reported that in spite of storing the reconstituted solutions under special storage conditions like refrigeration in the dark or at room temperature exposed to fluorescent light, the reconstituted or diluted aqueous solutions of carboplatin were stable for only seven days. There was significant decrease in assay of carboplatin. It has been further reported that carboplatin decomposes to form highly poisonous compounds like di-p.-hydroxo-bis (cis-diammineplatinum (II)), and tri-p-hydroxo-tris (cis-diammineplatinum (II) which appear as black silver deposits when stored in glass containers.

Further, in spite of many attempts and suggestions to prepare storage stable solutions of carboplatin in the art, there has been recall of commercial carboplatin solutions from the market due to reports of appearance of particulate matter. For example, Ebewe Pharma a marketing partner of Novartis, in their press release dated Mar. 29, 2012, announced recall of carboplatin aqueous solution (10 mg/ml) in Hong Kong due to the appearance of precipitates in several batches. Similarly, in the press release, Indiana State Department of Health dated Apr. 27, 2015 notified the local health department about the recall of injectable products—carboplatin 10 mg/ml 100 ml vials manufactured by Mylan Pharma, because of appearance of visible foreign particulate matter.

Thus, there lies an urgent need to provide a storage stable and suitable for direct infusion injectable solution of carboplatin that is which free from numerous stability related problems of carboplatin.

The present invention indeed achieves this objective and provides a parenteral dosage form comprising a storage stable aqueous solution of carboplatin stored in an infusion container.

SUMMARY OF INVENTION

The present invention provides a parenteral dosage form having an infusion container filled with an aqueous solution in volumes ranging from 40 ml to 500 ml comprising 1 to 2 mg/ml of carboplatin, stabilizing amount of ammonium sulphate and optionally, dissolved oxygen content is in the range of about 5 to 50 ppm.

The present invention can be summarized as follows:

A. A parenteral dosage form having an infusion container filled with an aqueous solution in volumes ranging from 40 ml to 500 ml comprising 1 mg/ml to 2 mg/ml of carboplatin, wherein the solution contains known impurity of 1, 1-cyclobutanedicarboxylic acid in an amount of not more than 1.0% by weight of carboplatin and the solution remains physically stable when stored at room temperature.

B. The parenteral dosage form as described in A, wherein the solution comprises 1 mg/ml of carboplatin, stabilizing amount of ammonium sulphate and optionally, dissolved oxygen content in the range of about 5 ppm to 50 ppm.

C. The parenteral dosage form as described in B, wherein the stabilizing amount of ammonium sulphate is 0.2 mg/ml to 2.0 mg/ml and the dissolved oxygen content is in the range of about 5 ppm to 10 ppm.

D. The parenteral dosage form as described in B, wherein the stabilizing amount of ammonium sulphate is 0.02 mg/ml or more and the dissolved oxygen content is in the range of about 10 ppm to 50 ppm.

E. The parenteral dosage form as described in C or D, wherein the volume of aqueous solution is 50 ml.

F. The parenteral dosage form as described in A or B wherein the aqueous solution is free of dextrose.

G. The parenteral dosage form as described in A, wherein the solution comprises 2 mg/ml of carboplatin, stabilizing amount of ammonium sulphate and dissolved oxygen content in the range of about 5 ppm to 50 ppm.

H. The parenteral dosage form as described in G, wherein stabilizing amount of ammonium sulphate is 0.02 mg/ml or more and the dissolved oxygen content is in the range of about 10 ppm to about 50 ppm.

I. The parenteral dosage form as described in G, wherein the stabilizing amount of ammonium sulphate is 0.5 mg/ml to 2.0 mg/ml and the dissolved oxygen content is in the range of about 5 ppm to about 10 ppm.

J. The parenteral dosage form as described in claim H or I, wherein the volume of aqueous solution is 50 ml.

DESCRIPTION OF THE INVENTION

Instability of carboplatin has been a major setback. In order to arrive at a storage stable aqueous solution of carboplatin that is free of any instability problem such as appearance of particulate matter during long term storage, the present inventors identified an extreme stress condition of subjecting the test to autoclaving. It is assumed that once the solution passes this test, the parenteral dosage form will be stable physically and chemically, when stored at ambient storage conditions such as room temperature throughout the shelf life of the product.

The term "extreme stress condition" as used herein means subjecting the parenteral dosage form to autoclaving at 121° C. for 7 minutes. In order to perform the test, the parenteral dosage form is prepared and overwrapped in an aluminum secondary pouch and then subjected to autoclaving at 121° C. for 7 minutes. The autoclaved filled infusion containers are visually observed for any discoloration, precipitation or crystal formation. Presence of any one of them or all is an indicator of instability. The parenteral dosage form that sustains the autoclaving at 121° C. for 7 minutes without any precipitation, is found to be and therefore considered to be stable for two years when stored at room temperature.

The term "stabilizing amount of ammonium sulphate" as used herein means the amount of ammonium sulphate required to stabilize the aqueous solution of carboplatin stored in parenteral dosage form having an infusion container when subjected to extreme stress conditions.

The term "physically stable" as used herein means that the parenteral dosage form comprising an aqueous solution of carboplatin when subjected to autoclaving at 121° C. for 7 minutes, the aqueous solution shows no sign of precipitation or crystal formation or discoloration. The parenteral dosage form that sustains the autoclaving at 121° C. for 7 minutes without any precipitation, is found to be and therefore, is considered to be stable for two years when stored at room temperature.

The term 'chemically stable' as used herein means that the aqueous solution of carboplatin shows acceptable levels of known and unknown impurities during the shelf life of the product, particularly when stored at room temperature for at least two years. According to preferred embodiments, the content of known impurity 1,1-cyclobutanedicarboxylic acid is not more than 1.0% by weight of carboplatin when stored at room temperature for two years.

According to an embodiment, the parenteral dosage form comprises storage stable aqueous solution of carboplatin comprising carboplatin in a concentration in the range of about 1 to 2 mg/ml. According to another embodiment, the aqueous solution of carboplatin is physically stable when subjected to extreme condition of autoclaving at 121° C. for 7 minutes i.e. the aqueous solution shows no sign of precipitate or crystal or discoloration. According to another embodiment, the aqueous solution is physically and chemically stable throughout the shelf life. The parenteral dosage form that sustains the autoclaving at 121° C. for 7 minutes without any precipitation or crystallization or discoloration, is stable for at least two years when stored at room temperature.

The present invention provides a parenteral dosage form having an infusion container filled with an aqueous solution in volumes ranging from 40 ml to 500 ml comprising 1 mg/ml to 2 mg/ml of carboplatin, wherein the solution contains known impurity of 1,1-cyclobutanedicarboxylic acid in an amount of not more than 1.0% by weight of carboplatin and the solution remains physically stable when stored at room temperature for a period of about two years.

In one preferred aspect, the present invention provides a parenteral dosage form having an infusion container filled with an aqueous solution in volumes ranging from 40 ml to 500 ml comprising 1 mg/ml of carboplatin, stabilizing amount of ammonium sulphate and optionally, dissolved oxygen content in the range of about 5 ppm to 50 ppm. Preferably, in one embodiment, the stabilizing amount of ammonium sulphate is 0.02-2.0 mg/ml and the dissolved oxygen content is in the range of about 10-50 ppm and the volume of aqueous solution is 50 ml. Preferably, in another embodiment, the stabilizing amount of ammonium sulphate is 0.5-2.0 mg/ml and the dissolved oxygen content is in the range of about 5-10 ppm and the volume of aqueous solution is 50 ml.

In another preferred aspect, the present invention provides a parenteral dosage form having an infusion container filled with an aqueous solution in volumes ranging from 40 ml to 500 ml comprising 2 mg/ml of carboplatin, stabilizing amount of ammonium sulphate and dissolved oxygen content in the range of about 5-50 ppm. Preferably, in one embodiment, the stabilizing amount of ammonium sulphate is 0.02-2.0 mg/ml and the dissolved oxygen content is in the range of about 10-50 ppm and the volume of aqueous solution is 50 ml. Preferably, in another embodiment, the stabilizing amount of ammonium sulphate is 0.2-2.0 mg/ml and the dissolved oxygen content is in the range of about 5-10 ppm and the volume of aqueous solution is 50 ml.

The parenteral dosage form of carboplatin according to the present invention is 'ready-to-infuse' or 'ready-to-administer', meaning that the aqueous solution of carboplatin is contained in the infusion container at a concentration of 1 to 2 mg/ml and the solution is meant to be directly infused or directly administrable to the patient without any need of any reconstitution, dilution, manipulation, transfer, handling or compounding before intravenous parenteral administration of the drug solution.

It may be noted that the aqueous solution of carboplatin having stabilizing amount of ammonium sulphate requires to be devoid of dextrose and chloride salts such as sodium chloride, potassium chloride or any other chloride. It is important that the solution is free of dextrose or sodium chloride, otherwise the solution is found to generate black precipitate and very high levels of impurity 1, 1-cyclobutanedicarboxylic acid and total impurities. Further, it was found by the inventors that the stabilizing amount of ammonium sulphate is dependent not only on the concentration of carboplatin but also on the dissolved oxygen content in the solution and the percentage of oxygen in the headspace of the filled container. For instance, when the concentration of carboplatin is 1 mg/ml, it was found that 0.02 mg/ml or more of ammonium sulphate stabilized the solution but at the lower range, the dissolved oxygen content in the aqueous solution was required to be about 10 to 50 ppm, whereas when higher concentration such as 0.2 to 2 mg/ml of ammonium sulphate was used, it did not require dissolved oxygen content in the range of about 10 to 50 ppm and the dissolved oxygen content can be as low as 5 to about 10 ppm. The level of oxygen in the solution is present in the range of about 5 to 10 ppm. On the other hand, when the concentration of carboplatin is 2 mg/ml, it was found that 0.02 mg/ml or more of ammonium sulphate stabilized the solution however, it required the presence of 10 to 50 ppm of dissolved oxygen content in the aqueous solution. Whereas, when the solution was not purged with oxygen, i.e. the amount of oxygen in the solution is in an amount of about 5 to about 10 ppm, then 0.5 mg/ml to 2 mg/ml of ammonium sulphate was found to be required for stabilization.

The aqueous solution having about 10 to 50 ppm of dissolved oxygen content, preferably 11 to 50 ppm of dissolved oxygen content were found to be stabilized with ammonium sulfate having concentration of 0.02 mg/ml or more, preferably, 0.02 to 2.0 mg/ml, such as for example 0.02, 0.04, 0.06, 0.08, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95 or 2.0 mg/ml. The stabilizing amount of ammonium sulfate for solutions having about 5 to about 10 ppm of dissolved oxygen content and 1 mg/ml of carboplatin is 0.2 mg/ml to 2.0 mg/ml, such as for example 0.20, 0.25, 0.30, 0.35, 0.40, 0.45, 0.50, 0.55, 0.60, 0.65, 0.70, 0.75, 0.80, 0.85, 0.90, 0.95, 1.0, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95 or 2.0 mg/ml. The stabilizing amount of ammonium sulfate for solutions having about 5 to about 10 ppm of dissolved oxygen content and 2 mg/ml of carboplatin is 0.5 mg/ml to 2.0 mg/ml, such as for example 0.50, 0.55, 0.60, 0.65, 0.70, 0.75, 0.80, 0.85, 0.90, 0.95, 1.0, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95 or 2.0 mg/ml.

The pH of the aqueous solution of carboplatin is in the range of about 4.0 to 6.0, preferably 4.5 to 5.5, such as for example 4.6, 4.7, 4.8, 4.9, 5.0, 5.1, 5.2, 5.3, 5.4 or 5.5. In most preferred embodiments the aqueous solution of carboplatin is free of pH adjusting agent or buffering agents.

The aqueous solution of the parenteral dosage of the present invention provide is a clear solution and not a formulations such as a novel drug delivery system like liposomes, niosomes, lipid vesicles, other lipid based drug delivery systems, micro particles, microcapsules, nanoparticles etc. which are essentially particulate in nature.

The aqueous solution of the parenteral dosage form according to the present invention is free of surfactants such as polyoxyethylene sorbitan fatty acid esters like tween 20, tween 80. In preferred embodiments, the aqueous solution of the parenteral dosage form according to the present invention is free of organic co-solvents such as ethanol, propylene glycol. In preferred embodiments, the aqueous solution of the parenteral dosage form according to the present invention is free of anti-oxidants such as sodium metabisulphite, sodium sulphite, methionine and the like. In preferred embodiments, the aqueous solution of the parenteral dosage form according to the present invention is free of chelating agent like edetate disodium, citric acid and the like.

It was found that instead of ammonium sulfate when following excipients were tried such as for example, antioxidants like sodium metabisulphite, sodium sulphite, methionine; chelating agent such as edetate disodium, citric acid; preservatives such as boric acid, metacresol, phenol, chlorobutanol; buffering or pH adjusting agents like trisodium citrate dehydrate, tromethamine, ammonia solution, sodium hydroxide, sodium acetate, sulfuric acid, sodium sulfate, potassium sulfate, sodium bicarbonate, phosphoric acid, tartaric acid, meglumine, arginine, solvents or solubilizers like propylene glycol, polyethylene glycol 300, polyethylene glycol 400, polyvinyl pyrrolidone, N,N dimethylacetamine, cyclodextrins; osmogens such as dextrose, sorbitol and glycerine; surfactants like polyoxyethylene sorbitan monooleate; chlorides such as sodium chloride, potassium chloride, calcium chloride, ammonium chloride and the like; then the aqueous solution showed formation of black precipitate or discoloration or generation of high content of 1, 1-cyclobutanedicarboxylic acid impurity was encountered as a problem. Particularly, when salts having chloride ions such as sodium chloride, potassium chloride, calcium chloride, ammonium chloride and the like were used, the aqueous solution showed formation of black precipitate.

According to preferred embodiment, the aqueous solution consist essentially of or consists of 1 mg/ml to 2 mg/ml of carboplatin and stabilizing amount of ammonium sulphate, wherein the solution contains known impurity of 1, 1-cyclobutanedicarboxylic acid in an amount of not more than 1.0% by weight of carboplatin and the solution remains physically stable when stored at room temperature. The term consist essentially of means that "the aqueous solution is free of excipients such as anti-oxidants like sodium metabisulphite, sodium sulphite, methionine; chelating agent like edetate disodium, citric acid; preservatives like boric acid, metacresol, phenol, chlorobutanol; buffering or pH adjusting agents like trisodium citrate dehydrate, tromethamine, ammonia solution, sodium hydroxide, sodium acetate, sulfuric acid, sodium sulfate, potassium sulfate, sodium bicarbonate, phosphoric acid, tartaric acid, meglumine, arginine, solvents or solubilizers like propylene glycol, polyethylene glycol 300, polyethylene glycol 400, polyvinyl pyrrolidone, N,N dimethylacetamine, cyclodextrins; osmogens like dextrose, sorbitol, glycerine; surfactants like polyoxyethylene sorbitan monooleate; chlorides such as sodium chloride, potassium chloride, calcium chloride, ammonium chloride".

According to the present invention, carboplatin solution is filled in container which is made up of a non-glass, plastic or polymeric material. In preferred embodiments, the container is a flexible infusion container made up of plastic or polymeric material. In preferred embodiments, the container is selected from a perfusion bag, infusion bag, flexible pouch and the like. The flexible infusion container may be single or multiple layered. The container is filled with drug solution and is hermetically sealed such as with the help of a stopper. In some embodiments, the infusion container may be made up of glass, such as glass vial, glass ampoule etc. In one preferred embodiment, the containers have a single outlet for withdrawal of the aqueous solution while being administered intravenously. The volume of each infusion container is in the range of about 40 to 500 ml, like 40, 50, 75, 100, 150, 165, 180, 195, 200, 215, 235, 260, 285, 300, 310, 340, 380, 400, 420, 460 or 500 ml. In one embodiment, a kit is provided having two or more infusion containers. According to another embodiment, the dose provided in each infusion container is tabulated below.

| Aqueous solution of Carboplatin at a concentration of 2 mg/ml | |
| --- | --- |
| Dose provided per container | Volume of the container |
| 80 mg | 40 mL |
| 100 mg | 50 mL |
| 150 mg | 75 mL |
| 200 mg | 100 mL |
| 300 mg | 150 mL |
| 330 mg | 165 mL |
| 360 mg | 180 mL |
| 390 mg | 195 mL |
| 430 mg | 215 mL |
| 470 mg | 235 mL |
| 520 mg | 260 mL |
| 570 mg | 285 mL |
| 620 mg | 310 mL |
| 680 mg | 340 mL |
| 760 mg | 380 mL |
| 840 mg | 420 mL |
| 920 mg | 460 mL |
| 1000 mg | 500 mL |

According to yet another embodiment, the dose provided in each infusion flexible container is tabulated below.

| Aqueous solution of Carboplatin at a concentration of 1 mg/ml | |
| --- | --- |
| Dose provided per container | Volume of the container |
| 40 mg | 40 mL |
| 60 mg | 60 mL |
| 80 mg | 80 mL |
| 100 mg | 100 mL |
| 150 mg | 150 mL |
| 200 mg | 200 mL |
| 300 mg | 300 mL |
| 330 mg | 330 mL |
| 360 mg | 360 mL |
| 390 mg | 390 mL |
| 430 mg | 430 mL |

-continued

| Aqueous solution of Carboplatin at a concentration of 1 mg/ml | |
|---|---|
| Dose provided per container | Volume of the container |
| 470 mg | 470 mL |
| 500 mg | 500 mL |

The parenteral dosage form of the present invention is prepared by a process comprising the steps of:
a. adding required amount of osmogen in water for injection and dissolving it till it completely dissolves;
b. adding required amount of stabilizing agent ammonium sulphate under continuous stirring;
c. adding the required amount of carboplatin to solution of step (b) under continuous stirring and making the volume with water for injection;
d. filtering the solution of step (c) through 0.2µ filter; and
e. filling the filtered solution of step (d) in suitable infusion container in volumes ranging from about 40 ml to about 500 ml and hermitically sealing the infusion container; wherein, optionally, oxygen is purged in water for injection during the steps (a), (b) and before filling into infusion container such that the dissolved oxygen content in the solution is in range of about 10-50 ppm and optionally filling the head space with oxygen before sealing the container;
   wherein, the parenteral dosage form is overwrapped with secondary aluminum pouch and the space between the infusion container and the secondary aluminum pouch is filled with oxygen and is sealed hermetically sealed.

According to one specific embodiment, the parenteral dosage form of the invention comprise an infusion container filled with an aqueous solution in volumes ranging from 40 ml to 500 ml comprising 1 mg/ml to 2 mg/ml of carboplatin, stabilizing amount of ammonium sulphate and dissolved oxygen content in the range of about 5 ppm to 50 ppm, wherein the solution contains known impurity of 1, 1-cyclobutanedicarboxylic acid in an amount of not more than 1.0% by weight of carboplatin and the solution remains physically stable when stored at room temperature.

According to one specific embodiment, the parenteral dosage form of the invention comprises of an infusion container filled with an aqueous solution in volumes ranging from 40 ml to 500 ml, the solution comprising 1 mg/ml of carboplatin, stabilizing amount of ammonium sulphate and dissolved oxygen content in the range of about 10-50 ppm. The aqueous solution is free of dextrose. Preferably, the stabilizing amount of ammonium sulphate is 0.02 mg/ml to 2.0 mg/ml. The solution contains known impurity of 1, 1-cyclobutanedicarboxylic acid in an amount of not more than 1.0% by weight of carboplatin and the solution remains physically stable when stored at room temperature.

According to another specific embodiment, the parenteral dosage form of the invention comprises of an infusion container filled with an aqueous solution in volumes ranging from 40 ml to 500 ml, the solution comprising 2 mg/ml of carboplatin, stabilizing amount of ammonium sulphate and dissolved oxygen content in the range of about 10-50 ppm. The aqueous solution is free of dextrose. Preferably, the stabilizing amount of ammonium sulphate is 0.02 mg/ml to 2.0 mg/ml. The solution contains known impurity of 1, 1-cyclobutanedicarboxylic acid in an amount of not more than 1.0% by weight of carboplatin and the solution remains physically stable when stored at room temperature.

According to another specific embodiment, the parenteral dosage form of the invention comprises of an infusion container filled with an aqueous solution in volumes ranging from 40 ml to 500 ml, the solution comprising 1 mg/ml of carboplatin, stabilizing amount of ammonium sulphate and dissolved oxygen content in the range of about 5-10 ppm. The aqueous solution is free of dextrose. Preferably, the stabilizing amount of ammonium sulphate is 0.2 mg/ml to 2.0 mg/ml. The solution contains known impurity of 1, 1-cyclobutanedicarboxylic acid in an amount of not more than 1.0% by weight of carboplatin and the solution remains physically stable when stored at room temperature.

According to another specific embodiment, the parenteral dosage form of the invention comprises of an infusion container filled with an aqueous solution in volumes ranging from 40 ml to 500 ml, the solution comprising 2 mg/ml of carboplatin, stabilizing amount of ammonium sulphate and dissolved oxygen content in the range of about 5-10 ppm. The aqueous solution is free of dextrose. Preferably, the stabilizing amount of ammonium sulphate is 0.5 mg/ml to 2.0 mg/ml. The solution contains known impurity of 1, 1-cyclobutanedicarboxylic acid in an amount of not more than 1.0% by weight of carboplatin and the solution remains physically stable when stored at room temperature.

The invention will now be further described by the following examples, which are illustrative rather than limiting.

EXAMPLES

Comparative examples 1A to 1D and example 1E to 1H.

TABLE 1

Effect of various parameters on physical stability of carboplatin solution upon subjecting to extreme stress condition of autoclaving at 121° C. for 7 minutes.

Figure 1:
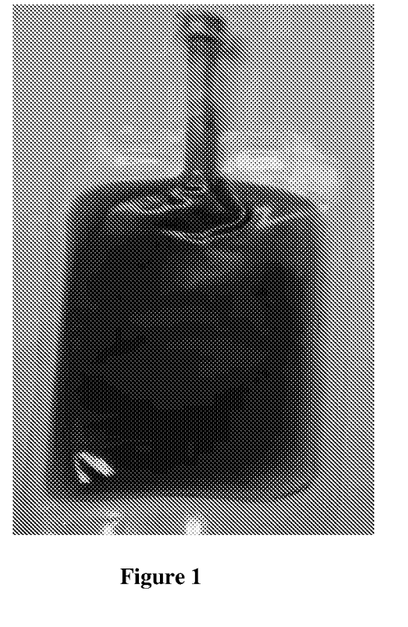
FIG. 1 illustrates the physical appearance (black precipitate) of solutions according to comparative examples 1A, 1B, 1C, 1D having concentration of 1 mg/ml, when subjected to extreme stress condition of autoclaving at 121° C. for 7 minutes.

| Examples | $(NH_4)_2SO_4$ (mg/ml) | Mannitol (mg/ml) | [Oxygen purging Yes = (+) & No = (−)] And [Dissolved oxygen content Values in ppm] | % Head space oxygen (X %) | Observation upon subjecting to extreme stress condition | Physical observation photograph |
|---|---|---|---|---|---|---|
| Comparative Examples | | | | | | |
| 1A | 0 | 50 | −(6.8 to 8.2) | 17.9-18.9 | Black precipitate | See FIG. 1 |
| 1B | 0 | 50 | +(19.1 to 28.4) | 40.4-80 | | |
| 1C | 0.02 | 50 | −(6.8 to 8.2) | 17.9-18.9 | | |
| 1D | 0.1 | 50 | −(6.8 to 8.2) | 17.9-18.9 | | |

TABLE 1-continued

Effect of various parameters on physical stability of carboplatin solution upon subjecting to extreme stress condition of autoclaving at 121° C. for 7 minutes.

Figure 2:
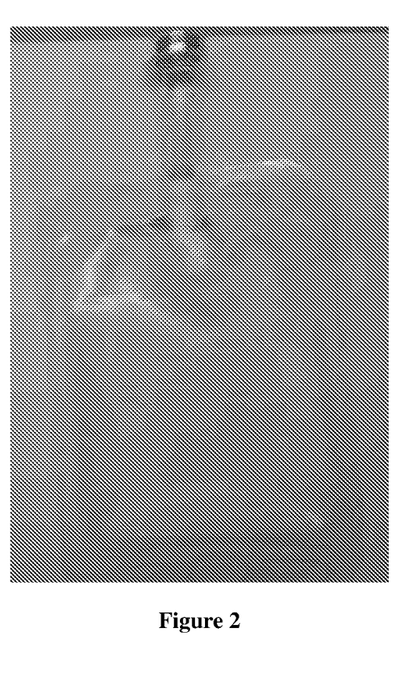
FIG. 2 illustrates the physical appearance (clear solution) of solutions according to working examples 1E, 1F, 1G, 1H having concentration of 1 mg/ml, when subjected to extreme stress condition of autoclaving at 121° C. for 7 minutes.

| Examples | $(NH_4)_2$ $SO_4$ (mg/ml) | Mannitol (mg/ml) | [Oxygen purging Yes = (+) & No = (−)] And [Dissolved oxygen content Values in ppm] | % Head space oxygen (X %) | Observation upon subjecting to extreme stress condition | Physical observation photograph |
|---|---|---|---|---|---|---|
| Working Examples | | | | | | |
| 1E | 0.2 | 50 | −(6.8 to 8.2) | 17.9-18.9 | Clear solution | See FIG. 2 |
| 1F | 0.02 | 50 | +(19.1 to 28.4) | 40.4-80 | | |
| 1G | 1.0 | 50 | −(6.8 to 8.2) | 17.9-18.9 | | |
| 1H | 2.0 | 50 | −(6.8 to 8.2) | 17.9-18.9 | | |

Parenteral dosage form of EXAMPLES 1A, 1C, 1D 1E, 1G, 1H were prepared as follows: Water for injection was taken in a stainless steel vessel. Required quantity of mannitol was added to water and stirred until it was completely dissolved. Ammonium sulphate stock (0.5 to 50 mg/ml) solution was added under continuous stirring. Ammonium sulfate was not added in sample 1A. The required quantity of carboplatin was added under continuous stirring until it was dissolved. The volume was made up with water for injection. The solution was stirred and filtered through 0.2µ filter. The resulting solution was filled in flexible infusion containers of fill volume of 50 ml. The flexible infusion containers were then over wrapped with secondary aluminum pouch. The space between the flexible infusion containers and the secondary aluminum pouch was filled with atmospheric air. The wrapped flexible infusion containers were then subjected to stress condition of autoclaving at 121° C. for 7 minutes. The solution in the flexible infusion containers showed black precipitate or solution discoloration upon autoclaving indicative of physical instability of the aqueous solution.

Parenteral dosage form of EXAMPLES 1B and 1F were prepared as follows: Water for injection was taken in a stainless steel vessel and was purged with oxygen in it for about 15-30 minutes. Required quantity of mannitol was added to water and stirred until it was completely dissolved. Ammonium sulphate stock solution (0.5 to 50 mg/ml) was added under continuous stirring. Ammonium sulfate was not added in sample 1B. Oxygen purging was stopped and the required quantity of carboplatin was added under continuous stirring till it was dissolved. The volume was made up with water for injection purged with oxygen. The solution was stirred and filtered through 0.2µ filter. The resulting solution was finally purged with oxygen and filled in flexible infusion containers of fill volume of 50 ml. The headspace of the flexible infusion containers were replaced with oxygen by continuous flow of oxygen over the headspace for about 30 to 120 seconds and were sealed under oxygen atmosphere. The flexible infusion containers were then over wrapped with secondary aluminum pouch. The space between the flexible infusion containers and the secondary aluminum pouch was filled with oxygen.

The parenteral dosage forms of examples 1A to 1H were subjected to extreme stress condition of autoclaving at 121° C. for 7 minutes and the solutions were observed for any physical instability. The observations are given in Table 1.

It could be concluded from Table 1 that for 1 mg/ml carboplatin solution, stabilizing amount of ammonium sulphate was 0.02 mg/ml or more but it required oxygen purging such that the dissolved oxygen content is in the range of 10-50 ppm and oxygen levels in the headspace is controlled. However, when at least 0.2 mg/ml or more amount of ammonium sulphate was used, it was found that oxygen purging and controlled levels of oxygen in the headspace was not required (See Example 1E) Ammonium sulfate acts as stabilizing agent in an amount of 0.2 mg/ml or more, such as 0.2 mg/ml to 2.0 mg/ml.

Comparative Examples 2A to 2G

TABLE 2

Effect of various parameters on physical stability upon subjecting to extreme stress condition of autoclaving at 121° C. for 7 minutes. Comparative Examples

Figure 3:
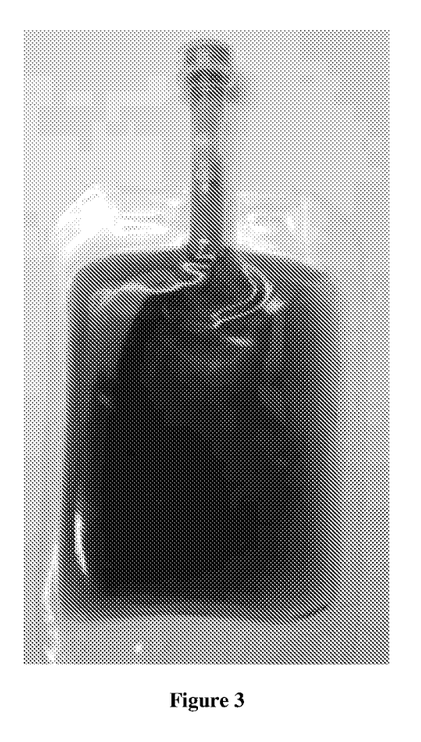
FIG. 3 illustrates the physical appearance (black precipitate) of solutions according to comparative examples 2A to 2G having concentration of 2 mg/ml, when subjected to extreme stress condition of autoclaving at 121° C. for 7 minutes.

| Ex. No. | **$(NH_4)_2SO_4$ (mg/ml) # $NH_3$ (mg/ml) | Diluent (mg/ml) | [Oxygen purging Yes = + ; No = − And [Dissolved oxygen content values in ppm] | % Head space oxygen (X %) | Observation upon subjecting to extreme stress condition | Physical observation- Photograph |
|---|---|---|---|---|---|---|
| 2A | — | Mannitol 50 | −(6.8 to 8.2) | 17.9-18.9 | Black precipitate | See FIG. 3 |
| 2B | — | | +(19.1 to 28.4) | 40.4-80 | | |
| 2C | 0.02** | | −(6.8 to 8.2) | 17.9-18.9 | | |
| 2D | 0.02** | — | −(6.8 to 8.2) | 17.9-18.9 | | |
| 2E | 0.02** | Dextrose 50 | +(19.1 to 28.4) | 40.4-80 | | |
| 2F | 0.002* | Mannitol 50 | −(6.8 to 8.2) | 17.9-18.9 | | |

TABLE 2-continued

Effect of various parameters on physical stability upon subjecting to extreme stress condition of autoclaving at 121° C. for 7 minutes.
Comparative Examples

| Ex. No. | **$(NH_4)_2SO_4$ (mg/ml) # $NH_3$ (mg/ml) | Diluent (mg/ml) | [Oxygen purging Yes = + ; No = – And [Dissolved oxygen content values in ppm] | % Head space oxygen (X %) | Observation upon subjecting to extreme stress condition | Physical observation-Photograph |
|---|---|---|---|---|---|---|
| 2G | 0.4** | | –(6.8 to 8.2) | 17.9-18.9 | | |

Examples 2H to 2L

TABLE 3

Effect of various parameters on physical stability upon subjecting to extreme stress condition of autoclaving at 121° C. for 7 minutes.
Working Examples

Figure 4:
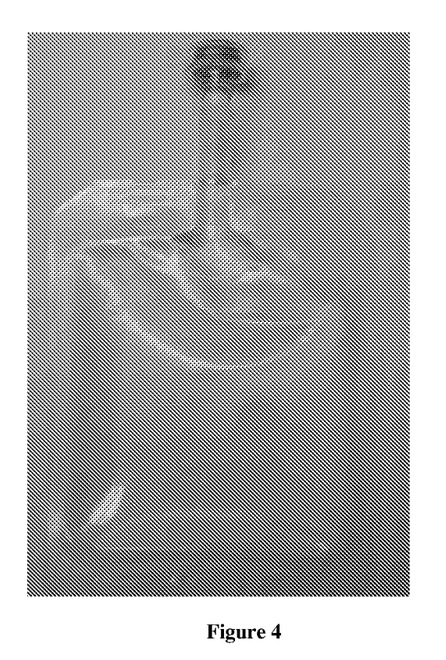
FIG. 4 illustrates the physical appearance (clear solution) of solutions according to working examples 2H to 2L having concentration of 2 mg/ml, when subjected to extreme stress condition of autoclaving at 121° C. for 7 minutes.

| Ex. No. | **$(NH_4)_2SO_4$ (mg/ml) | Diluent (mg/ml) | [Oxygen purging Yes = + ; No = – And [Dissolved oxygen content values in ppm] | % Head space oxygen (X %) | Observation upon subjecting to extreme stress condition | Physical observation-Photograph |
|---|---|---|---|---|---|---|
| 2H | 0.02** | Mannitol 50 | +(19.1 to 28.4) | 40.4-80 | Clear solution | See FIG. 4 |
| 2I | 1.0** | Mannitol 50 | –(6.8 to 8.2) | 17.9-18.9 | | |
| 2J | 2.0** | Mannitol 50 | –(6.8 to 8.2) | 17.9-18.9 | | |
| 2K | 0.02** | — | +(19.1 to 28.4) | 40.4-80 | | |
| 2L | 0.5** | Mannitol 50 | –(6.8 to 8.2) | 17.9-18.9 | | |

Parenteral dosage form of EXAMPLES 2A, 2C, 2D, 2F, 2G, 2I, 2J, and 2L were prepared as follows: Water for injection was taken in a stainless steel vessel. Required quantity of mannitol was added to water and stirred until it was completely dissolved. In sample 2D Mannitol was not added. Ammonium sulphate stock solution was added under continuous stirring in case of examples 2C, 2D, 2G, 2I, 2J and 2L Ammonia was added under continuous stirring in case of examples 2F instead of ammonium sulphate. Neither ammonium sulphate nor ammonia, was added to water in example 2A. The required quantity of carboplatin was added to the resulting solution under continuous stirring until it was dissolved. The volume was made up with water for injection. The solution was stirred and filtered through 0.2μ filter. The resulting solution was filled in flexible infusion containers of fill volume of 50 ml. The flexible infusion containers were then over wrapped with secondary aluminum pouch. The space between the flexible infusion containers and the secondary aluminum pouch was filled with atmospheric air. The wrapped flexible infusion containers were then subjected to stress condition of autoclaving at 121° C. for 7 minutes.

Parenteral dosage form of EXAMPLES 2B, 2E, 2H, and 2K were prepared as follows: Water for injection was taken in a stainless steel vessel and was purged with oxygen in it for about 15-30 minutes. Required quantity of mannitol was added to water and stirred until it was completely dissolved. In batch 2E dextrose was added instead of mannitol and in 2K neither mannitol nor dextrose was added Ammonium sulphate stock solution was added under continuous stirring. Neither Ammonium sulphate nor ammonia was added to water in example 2B. Oxygen purging was stopped and the required quantity of carboplatin was added under continuous stirring till it was dissolved. The volume was made up with water for injection purged with oxygen. The solution was stirred and filtered through 0.2μ filter. The resulting solution was finally purged with oxygen and filled in flexible infusion containers of fill volume of 50 ml. The headspace of the flexible infusion containers were replaced with oxygen by continuous flow of oxygen over the headspace for 30 to 120 seconds and were sealed under oxygen atmosphere. The flexible infusion containers were then over wrapped with secondary aluminum pouch. The space between the flexible infusion containers and the secondary aluminum pouch was filled with oxygen.

The parenteral dosage forms of examples 2A to 2L were subjected to extreme stress condition of autoclaving at 121° C. for 7 minutes and the solutions were observed for any physical instability. The parenteral dosage forms of all the examples showed black precipitate or discoloration when subjected to extreme stress condition of autoclaving at 121° C. for 7 minutes except for examples 2H, 2I, 2J, 2K, 2L.

It could be concluded from Table 3 that for 2 mg/ml carboplatin solution, stabilizing amount of ammonium sulphate was 0.02 mg/ml but it required oxygen in the range of 10-50 ppm to maintain oxygen levels in the headspace. However, when at least 0.5 mg/ml or more amount of ammonium sulphate is used, it was found that oxygen purging and controlled levels of oxygen in the headspace was not required. It was further observed that when a batch similar to batch 2H having solution comprising 2 mg/ml of carboplatin, 0.02 mg/ml ammonium sulfate, 50 mg/ml mannitol and dissolved oxygen content in the range of 10 to 50 ppm was charged for stability testing at room temperature (25° C./40% relative humidity) the solution was found to be stable with no precipitation, crystallization or discoloration of the solution upon storage for about 24 months. Also the content of known and total impurities remained minimal, for instance the content of known impurity 1, 1-cyclobutanedicarboxylic acid was found to be 0.60%, less than 1.0% by weight of carboplatin. Similarly, another batch that varied in content of ammonium sulfate being 0.2 mg/ml, the solution was found to be physically and chemically stable for 27 months when stored at room temperature (25° C./40% relative humidity).

We claim:

1. A parenteral dosage form having an infusion container filled with an aqueous solution in a volume ranging from 40 ml to 500 ml, the aqueous solution comprising 1 mg/ml to 2 mg/ml of carboplatin and 0.02 mg/ml to 2.0 mg/ml of ammonium sulphate, wherein
the aqueous solution contains known impurity of 1,1-cyclobutanedicarboxylic acid in an amount of not more than 1.0% by weight of carboplatin and the solution remains physically stable when stored at room temperature.

2. The parenteral dosage form of claim 1, wherein the solution comprises 1 mg/ml of carboplatin and a dissolved oxygen content in the range of about 5 ppm to 50 ppm.

3. The parenteral dosage form of claim 2, wherein the ammonium sulphate is in an amount ranging from 0.2 mg/ml to 2.0 mg/ml and the dissolved oxygen content is in an amount ranging from about 5 ppm to 10 ppm.

4. The parenteral dosage form of claim 2, wherein the dissolved oxygen content is in an amount ranging from about 10 ppm to 50 ppm.

5. The parenteral dosage form of claim 3, wherein the volume of the aqueous solution is 50 ml.

6. The parenteral dosage form of claim 1, wherein the aqueous solution is free of dextrose.

7. A parenteral dosage form of claim 1, wherein the solution comprises 2 mg/ml of carboplatin and a dissolved oxygen content in the range of about 5 ppm to 50 ppm.

8. The parenteral dosage form of claim 7, wherein the dissolved oxygen content is in an amount ranging from about 10 ppm to 50 ppm.

9. The parenteral dosage form of claim 7, wherein the ammonium sulphate is in an amount ranging from 0.5 mg/ml to 2.0 mg/ml and the dissolved oxygen content is an amount ranging from about 5 ppm to 10 ppm.

10. The parenteral dosage form of claim 8, wherein the volume of the aqueous solution is 50 ml.

11. The parenteral dosage form of claim 1, wherein the aqueous solution is free of chloride salts.

12. The parenteral dosage form of claim 1, wherein the infusion container is a perfusion bag, an infusion bag, or a flexible pouch.

13. The parenteral dosage form of claim 12, wherein the parenteral dosage form has been subjected to autoclaving.

14. The parenteral dosage form of claim 1, wherein the aqueous solution has a pH in the range of about 4.0 to 6.0.

15. The parenteral dosage form of claim 1, wherein the aqueous solution has a pH in the range of 4.5 to 5.5.

16. The parenteral dosage form of claim 1, wherein the aqueous solution is free of dextrose and sodium chloride.

17. The parenteral dosage form of claim 1, wherein the aqueous solution is free of one or more of chelating agents, preservatives, buffering or pH adjusting agents, solubilizers, co-solvents, and osmogens.

18. The parenteral dosage form of claim 1, wherein the aqueous solution is a ready-to-administer aqueous solution.

19. The parenteral dosage form of claim 2, wherein the volume of the aqueous solution is 40 ml, 60 ml, 80 ml, 100 ml, 150 ml, 200 nl, 300 ml, 330 ml, 360 ml, 390 ml, 430 ml, 470 ml, or 500 ml.

* * * * *